United States Patent [19]
Nohren, Jr.

[11] Patent Number: 4,979,654
[45] Date of Patent: Dec. 25, 1990

[54] CAP FOR USE WITH WATER TREATMENT APPARATUS

[75] Inventor: John E. Nohren, Jr., St. Petersburg, Fla.

[73] Assignee: Innova/Pure Water, Inc., Clearwater, Fla.

[21] Appl. No.: 517,453

[22] Filed: May 4, 1990

Related U.S. Application Data

[63] Continuation of Ser. No. 247,332, Sep. 21, 1988, abandoned, which is a continuation-in-part of Ser. No. 29,720, Mar. 24, 1987, Pat. No. 4,769,144, which is a continuation-in-part of Ser. No. 822,238, Jan. 24, 1986, Pat. No. 4,695,379.

[51] Int. Cl.$^5$ .............................................. B67D 3/00
[52] U.S. Cl. .................................... 222/482; 222/500; 222/519; 222/523; 222/552; 222/565; 215/314; 239/506; 239/514
[58] Field of Search ............... 222/482, 546, 519, 523, 222/552, 565, 499, 500, 564; 239/506, 514, 520; 215/309, 311, 308, 314

[56] References Cited

U.S. PATENT DOCUMENTS

| | | | |
|---|---|---|---|
| 1,958,414 | 5/1934 | Bogeaus | 222/499 |
| 2,017,036 | 10/1935 | Brady | 222/500 X |
| 2,267,754 | 12/1941 | Schroeder | 222/519 X |
| 2,708,057 | 5/1955 | Schmitt | 222/482 |
| 3,305,127 | 2/1967 | Baranne | 222/499 X |
| 3,776,433 | 12/1973 | DeTreitas | 222/519 |
| 4,769,144 | 9/1988 | Nohren, Jr. | 222/482 X |
| 4,802,610 | 2/1989 | Cheek et al. | 222/523 X |

FOREIGN PATENT DOCUMENTS

| | | | |
|---|---|---|---|
| 343651 | 10/1936 | Italy | 222/500 |
| 536239 | 11/1955 | Italy | 222/519 |
| 363610 | 9/1962 | Switzerland | 222/519 |
| 16107 | 7/1914 | United Kingdom | 222/482 |

Primary Examiner—Andres Kashnikow
Assistant Examiner—Gregory L. Huson
Attorney, Agent, or Firm—Nixon & Vanderhye

[57] ABSTRACT

A cap for use with water treatment apparatus specifically adapted to cooperate with an open neck of a bottle having an exterior projection formed on the neck thereof. The cap includes a lower component having a circumferentially continuous lower portion which has an interior projection adapted to cooperate with the exterior projection of the bottle, and surfaces for cooperatively engaging a tubular member mounted in the open neck of the bottle. The cap lower portion also includes a top portion having a central part and a peripheral part which has a plurality of circumferentially spaced through-extending openings, the openings disposed substantially 360 degrees around the circumference of the cap. The upper component of the cap is mounted for axially slidable movement relative to the lower component from a closed position wherein the upper component covers the openings, to an open position wherein the upper component is axially spaced from the lower component around the periphery thereof so that liquid may freely flow through the openings in the lower component top part, and then between the upper component and the lower component under the force of gravity.

8 Claims, 6 Drawing Sheets

CAP FOR USE WITH WATER TREATMENT APPARATUS

RELATED APPLICATIONS

This is a continuation of application Ser. No. 247,332,filed Sept. 21, 1988, now abandoned, which is a continuation-in-part of application Ser. No. 29,720,filed Mar. 24, 1987,now U.S. Pat. No. 4,769,144, which issued Sept. 6, 1988, which, in turn, is a continuation-in-part of application Ser. No. 822,238, filed Jan. 24, 1986, and now U.S. Pat. No. 4,695,379.

BACKGROUND AND SUMMARY OF THE INVENTION

There are many areas across the country that have significant amounts and types of contaminants in their drinking water. It is desirable, of course, to remove contaminants if possible; however, there have been a number of difficulties associated with producing a device that will remove a wide variety of target contaminants quickly and simply, and in an inexpensive manner.

According to the present invention, a water treatment apparatus is provided which is simple and inexpensive to manufacture, simple and easy to use, and successfully removes a wide variety of, or any desired specific, contaminants normally present in tap water. In one exemplary embodiment, the apparatus cooperates with a conventional common household container such as an empty milk bottle or juice jug, or like plastic or glass bottles, and ensures that only treated water is dispensed from the container once it is filled with water which is treated by the apparatus.

The three basic components of the apparatus according to the invention comprise an elongated tube, which may house certain water treatment media, a cartridge also containing water treatment media, and a cap. An additional adaptor component is also provided which enables use of a single cap design with different container or bottle designs.

In a first exemplary embodiment, the tube, which commonly would be of plastic, has open first and second ends. Adjacent its open first end, the tube has a plurality of projections extending radially from it, which projections are spaced from each other circumferentially around the tube, and which are adapted to make an interference fit with the interior surface of the neck of a conventional bottle or the like. A radially outwardly extending flange is also provided on the top of the projections, the flange minimizing the possibility that water will enter the bottle except by flowing through the open first end of the tube. The components are dimensioned so that liquid from within the bottle can flow between the interior surface of the bottle neck and the exterior surface of the tube, around the projections and past the flange, to be dispensed.

The water treatment media can comprise any of a wide variety of water treatment media such as activated carbon (or like material) to remove organic materials; halogenated resin fibers and/or halogenated resin beads to destroy bacteria and viruses; and/or materials which leach magnesium and calcium back into the water. The media typically would be disposed within a cartridge inserted into the tube adjacent the open second end thereof.

In a second exemplary embodiment according to this continuation-in-part application, the tube itself may contain one or more compartments for containing water treatment media such as carbon or absorbant media (e.g., ion exchange resins), biocidal media and the like. A replaceable cartridge may also be removably attached to the lower or outlet end of the tube. The cartridge preferably contains additional media, but may also contain flavoring concentrate, mineral and vitamin supplements, etc. In this way, it is possible to first remove contaminants from the water, so that a uniformly consistent water is blended with, e.g., the concentrate, to thereby produce a consistently uniform-tasting beverage. It will also be appreciated that in this second exemplary embodiment, the tube/cartridge assembly may be attached directly to a faucet or other water conduit, hose, etc. so that discharge occurs through the replaceable cartridge.

The replaceable cartridge is preferably in the form of a cylinder, open at its upper or inlet end and closed at its lower end. Arranged about the lower periphery of the cylindrical side wall are a plurality of sets of louvers, which serve to discharge water or other liquid 360° about the cartridge.

It will be appreciated that the tube may be fastened to any water source by a friction or bayonet type attachment. The same is true for the cartridge relative to the lower end of the tube.

In the first described embodiment, the cap cooperates with the exterior surface of the bottle neck, and is adapted to close off the tube first end while allowing passage of liquid from within the bottle between the tube and the neck. In one exemplary embodiment of the cap device, an upper cap portion is provided axially spaced from, and substantially co-extensive with, a lower cap portion, the lower cap portion having a plurality of arcuately shaped openings therein which are circumferentially spaced from each other around substantially 360 degrees. The upper and lower cap portions are spaced from each other a distance sufficient to allow liquid to flow through the openings in the lower portion top surface and to the space between the upper portion and the lower portion, and then away from the cap. The cap is affixed to the outer surface of the bottle neck by screw threads, cooperating snap rings, or the like. The cap typically would be made of high density polyethylene, or a platable ABS plastic.

In another embodiment, the upper portion of the cap is axially spaced from the lower portion of the cap by an integral center peg, and is removable by reason of the center peg being snap-fit into a hole formed in the lower portion. Alternatively, threads may be provided on the center peg to cooperate with threads on the lower portion of the cap, so that the cap may be opened or closed via rotation of the cap's upper portion in one direction or the other. A left-hand thread is preferred for the tightening or closing direction.

In another cap embodiment, the upper portion of the cap is captured within the lower portion of the cap but frictionally slidable between open and closed positions.

In still another cap embodiment, the upper portion of the cap is captured within the lower portion of the cap but freely slidable therein so that it remains normally closed by reason of gravitational forces when the bottle or container is in an upright position, but opens automatically upon a substantial tilting movement.

In a related aspect, this invention provides an adaptor which converts a bottle designed for snap-on tops or caps to a bottle which is capable of receiving screw-on caps.

It is, therefore, the primary object of the present invention to provide a simple yet effective water treatment apparatus which may be simply and inexpensively used for removing contaminants from drinking water. This and other objects of the invention will become clear from an inspection of the detailed description of the drawings, and from the appended claims.

BRIEF DESCRIPTION OF THE DRAWINGS

FIG. 16A is a partial side cross-sectional view of the cap shown in FIG. 16 but wherein a threaded connection is provided between the upper and lower portions of the cap;

DETAILED DESCRIPTION OF THE DRAWINGS

Figure 1:
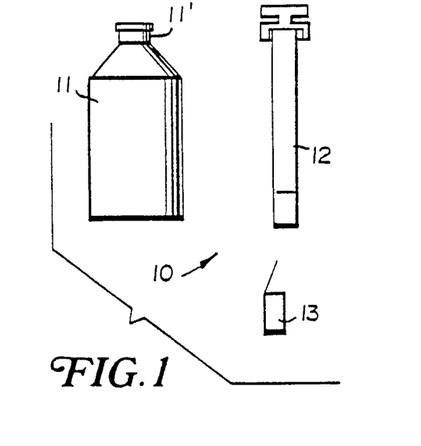
FIG. 1 is a side schematic view illustrating a water treatment device according to the present invention, and a bottle with which it is adapted to be utilized.
Figure 2:
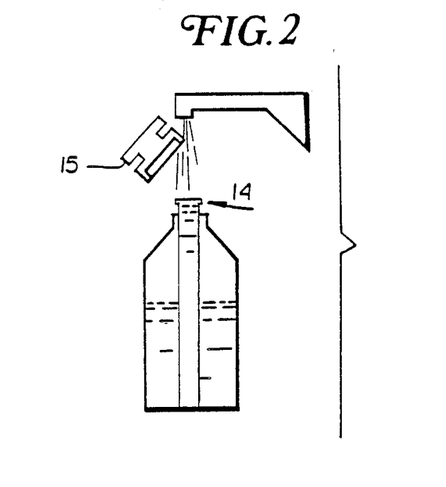
FIG. 2 is a side schematic view showing the device of FIG. 1 in use with a bottle during the filling of the bottle, and with the cap of the device removed.
Figure 8:
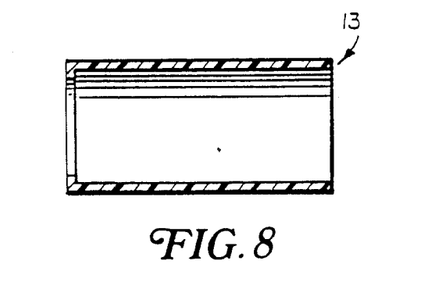
FIG. 8 is a side cross-sectional view of the cartridge of the device of FIG. 1.
Figure 9:
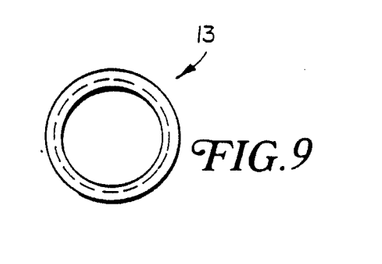
FIG. 9 is a bottom plan view of the cartridge of FIG. 8.

A first exemplary water treating device according to the present invention is illustrated generally by reference numeral 10 in the drawings, and it is adapted to be utilized in association with a conventional container such as a bottle 11 which has a neck 11'. The bottle 11 typically would be of glass or plastic. The major components of the device 10 comprise the tube 12, which is seen most clearly in FIGS. 4 through 7, a cartridge 13 for the water treatment media, which is seen most clearly in FIGS. 1, 8, and 9, and a cap 15, 115, 215 and 315 which is seen most clearly in FIGS. 2 and 10 through 16.

There is a configuration of flange and projections, shown generally by reference numeral 14, formed at a first end of the hollow tube 12. The tube, which typically would be made of plastic, has open first and second ends shown generally by reference numerals 17 and 18, respectively, in FIG. 4. Adjacent the first open end 17 there is provided the flange and projection construction 14. This construction preferably comprises a plurality (four in the exemplary embodiment illustrated in the drawings) of inverted L-shaped projections 19 which each have the L portion 20 thereof extending generally horizontally and adapted to abut the top of a bottle 11 at its neck 11' (as seen in FIGS. 10, 11, 14, 15 and 16), and having the leg portion 21 of the L extending radially a sufficient distance from the exterior surface 22 of the tube 12 so that it forms an interference fit with the bottle 11 at the neck 11'. The bottom of the leg 21 is typically tapered, as illustrated by reference numeral 23 in FIG. 6, as by having a 30 degree angle, so that as the tube 12 is inserted into the bottle the tapered portions 23 will help locate and position the projections 19 within the bottle.

Figure 5:
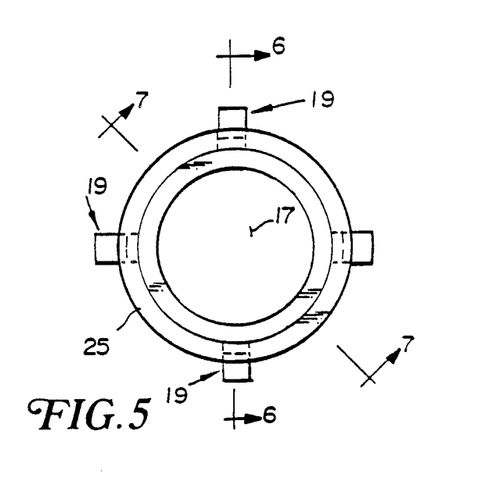
FIG. 5 is a top plan view of the tube of FIG. 4.
Figure 6:
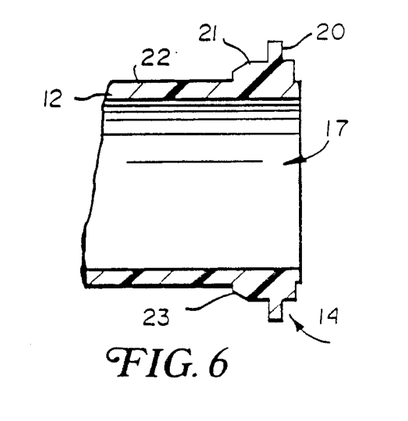
FIGS. 6 and 7 are cross-sectional views of the tube of FIG. 5, taken along lines 6—6 and 7—7 thereof.
Figure 7:
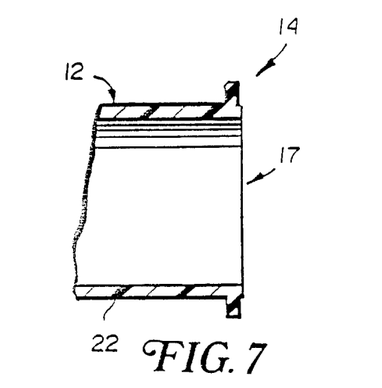

Located "above" the plurality of attaching projections 19 is a flange 25 which is circumferentially continuous around the tube 12, as seen most clearly in FIG. 5. The flange 25 assists—when the bottle 11 is being filled with liquid such as water from a faucet 30—see FIG. 2—in preventing the water from entering the bottle 11 except through the open end 17 of the tube 12. However the flange 25 does allow water to flow between the interior surface of the neck 11' and the exterior surface 22 of the tube 12, as can be seen by the flow arrows indicated in FIG. 11.

Located adjacent the second end of the tube 12, within the tube 12, is the water treatment media. The water treatment media preferably is provided within a cartridge 13, which cartridge 13 preferably is also of plastic. A screen (not shown) at the distal end of cartridge 13 prevents the media from flowing into the bottle 11 with the treated water.

The water treatment media may be any one or more of the following, in various tiers or levels: activated carbon, or like material for the removal of organics from the water; halogenated resin fibers and/or halogenated resin beads or other media, for destroying bacteria and viruses within the water; ion exchange resins (such as hydrogen based action exchange resin for the removal of sodium) for removal ionic materials from the water; and/or materials which leach magnesium and/or calcium back into the water or removing bacteria by microfiltration, or adding vitamins, minerals and flavorings to the water. Since sodium ion exchange softening often results in the removal of magnesium and calcium from the water, and since those ions are desirable in the water, the water may be "reconstituted" by providing materials which leach these compositions back into the water. Of course if a mixed ion exchange resin bed is provided as a water treatment media within the cartridge 13, the calcium and magnesium leaching material would be provided downstream of the ion exchange resin. Note that any variety of water treatment media desired could be disposed within the tube 12, so that it would be useful for treating water for use in steam irons, batteries, and other devices which can desirably employ deionized water. The tube may also be made of a larger diameter to accommodate greater quantities of media.

The cap 15 is preferably of high density polyethylene, or other suitable plastic (that is, one having properties generally comparable to those of high density polyethylene) such as a platable ABS plastic. The cap performs a number of functions, but primarily serves to seal off the open end 17 of the tube 12 during pouring so that only liquid which has been treated by the media within the cartridge 13 will be dispensed from the container 11.

Figure 10:
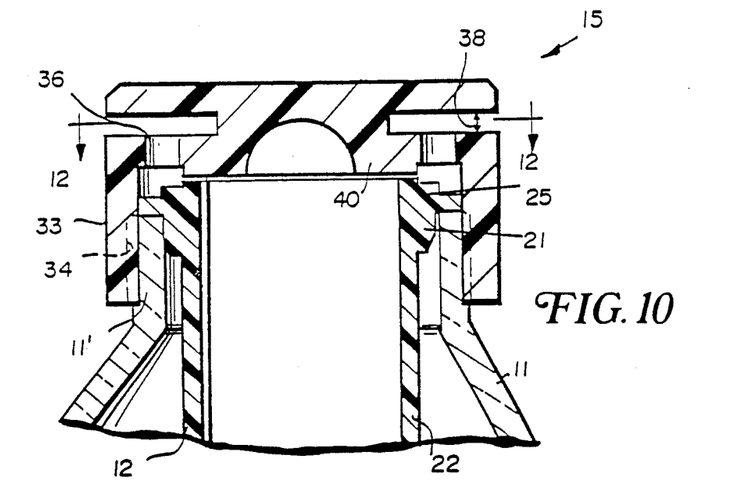
FIG. 10 is a side cross-sectional view of the assembled device according to the invention in association with a bottle, the cross-section being taken at an area of the tube where it has an interference fit with the bottle.
Figures 11, 12, 14:
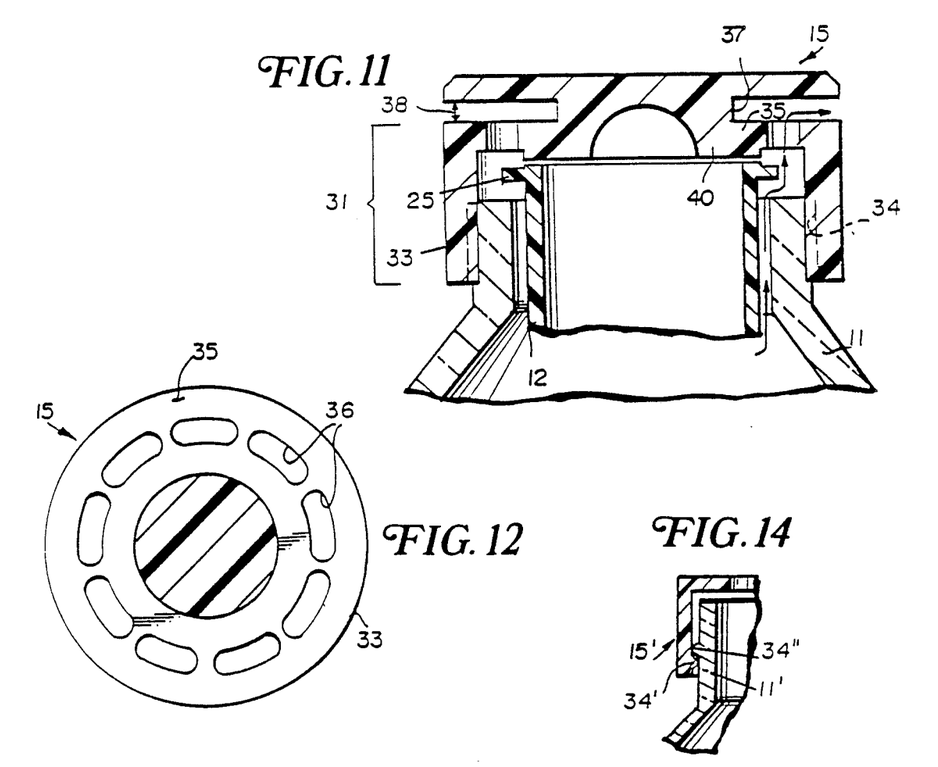
FIG. 11 is a view similar to that of FIG. 10 but wherein the cross-section is taken at an area of the tube between the interference-fit providing projections.
FIG. 12 is a cross-sectional view of the cap of the device of FIG. 10 taken along lines 12—12 thereof.
FIG. 14 is a side schematic cross-sectional view of a modified form of device which employs snap rings to secure the cap to a bottle.

In the embodiment illustrated in FIGS. 10 and 11, the cap 15 is provided with a lower portion 31 thereof and an upper portion 32. The lower portion is generally cylindrical in configuration including a continuous side element 33 which preferably has internal screw threads, shown generally by reference numeral 34 in FIGS. 10 and 11, associated therewith which cooperate with external screw threads (not shown) disposed on the neck 11' of the container 11. The lower portion 31 also includes a top surface 35 which has means defining a plurality of openings 36 therein (see FIGS. 10 through 12) through which openings liquid being poured flows. As illustrated in FIG. 12, each of the openings 36 is circumferentially spaced from the others, for example each opening 36 may cover an arc of about 20 degrees, with about 20 degrees between the major portions of the openings 36, and the collective openings 36 extend substantially 360 degrees around the circumference of the top surface 35 so that liquid can be poured through the cap 15 irrespective of the orientation of the cap with respect to the bottle.

Instead of screw threads, snap rings or the like, may be provided as projections for holding the cap on the bottle. FIG. 14 schematically illustrates a cap 15' with snap rings 34' cooperating with a like circumferentially continuous snap ring 34" on the bottle neck 11'.

Note that an integral intermediate stem portion 37 is provided which interconnects the top portion 32 and the lower portion 31, there being a fixed spacing—shown generally by reference numeral 38 in FIG. 11—between the portions 31, 32 sufficient to allow liquid to flow therebetween. The upper portion 32 is substantially co-extensive with the lower portion 31, and covers the openings 36 so that contaminants cannot enter the treated water through the top of the cap.

The central portion of the top surface 35, denoted by reference numeral 40 in FIGS. 10 and 11, engages the top surface of the tube 12 adjacent the first end 17 thereof and seals it (see FIGS. 10 and 11) so that water may not flow from the interior of the tube 12 to the openings 36. Due to the material of which the cap 15 is made, and/or the material of the tube 12, and the tolerances between the components, the seal is tight enough to essentially prevent any flow of liquid from the interior of the tube 12 to the openings 36.

Figure 13:
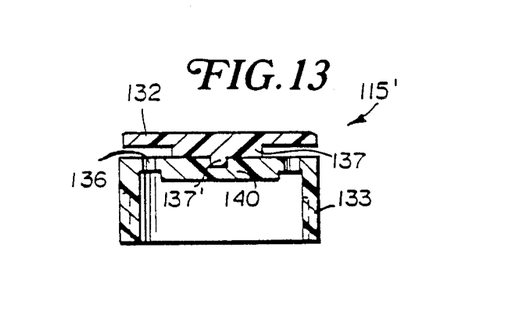
FIG. 13 is a side cross-sectional view of a modified form of cap according to the present invention.

FIG. 13 shows an alternative construction of a cap 115 according to the invention. This construction is similar to that shown in FIGS. 10 and 11 except that the upper portion 132 of the cap is removable, there being a peg 137' which provides a connection between the stem portion 137 and the central sealing portion 140. By grasping the upper portion 132 and pulling upwardly, the portion 132 may be detached from the central portion 140 by the peg 137' being pulled out of the hole for it formed in the central portion 140, and by the reverse action it may be snapped into place.

Figure 15:
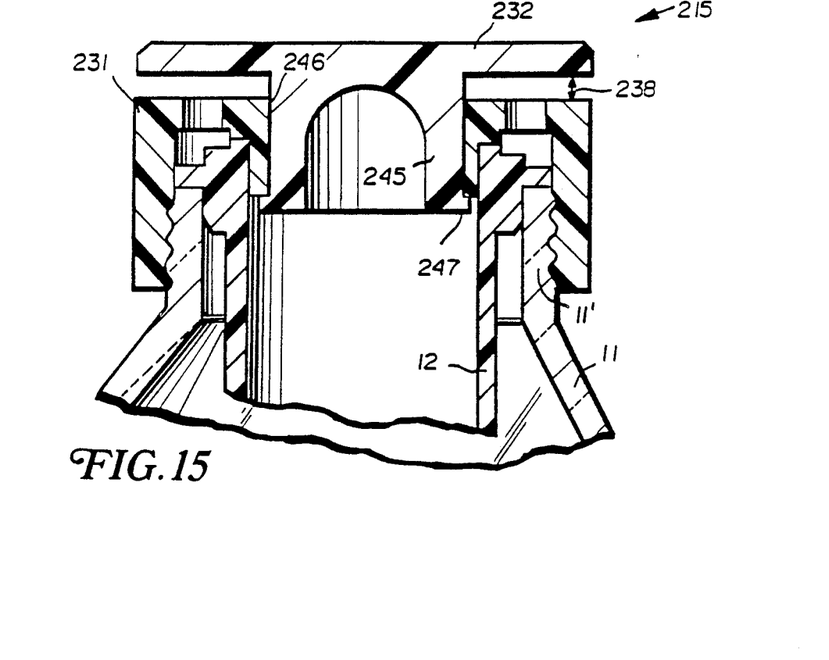
FIG. 15 is a side cross-sectional view of the assembled device according to another embodiment of the invention wherein the upper portion of the cap is friction fit within the lower portion of the cap and movable between open and closed positions.

In FIG. 15, another exemplary cap construction 215 is shown wherein like numerals, prefixed by a "2" are used to designate elements corresponding to the embodiment shown in FIGS. 10 and 11. The cap 215 is similar in construction to the previously described embodiments, with the essential differences that a flat disc-like upper portion 232 is friction fit within lower portion 231 for sliding movement between open and closed positions. Thus, whereas the embodiment shown in FIGS. 10 and 11 has a fixed spacing 38 between the upper and lower cap portions, the embodiment in FIG. 15 permits a corresponding space 238 to be closed to prevent spillage in the event the container is tipped over, and to assist in maintaining the freshness of the contained liquid.

To this end, the upper portion 232 is provided with a depending substantially hollow, annular center stem portion 245 which is slidably received within a bore 246 formed in the lower cap portion 231. The stem portion 245 has a relatively large diameter approaching the inner diameter of tube 12.

After assembly, the lower end of stem 245 is flattened in the manner of a conventional rivet to form an outwardly directed flange or stop means 247 which serves to capture the upper portion 232 within the lower portion 231 and to limit upward movement of the upper portion relative to the lower portion. In this regard, stem 245 has an axial length greater than the bore 246 in order to create the space 238 when the upper portion is pulled upwardly into an open position.

It will be further understood that stem 245 is friction fit within the bore 246 so that the cap, once opened, will remain open until pushed downwardly into a closed position. The cap otherwise functions identically to the embodiment illustrated in FIGS. 10 and 11.

Figures 16, 17:
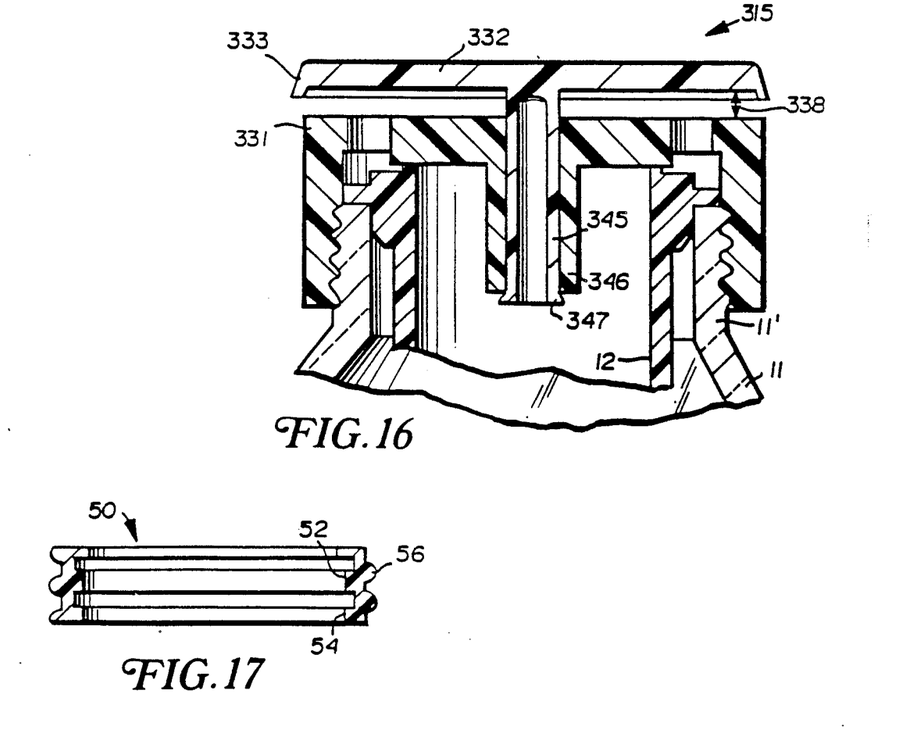
FIG. 16 is a side cross-sectional view of the assembled device according to still another embodiment of the invention wherein the upper portion of the cap is freely slidable within the lower portion of the cap and gravity actuated between open and closed positions.
FIG. 17 is a cross-sectional view of an adaptor element in accordance with another aspect of the invention.
Figure 16:
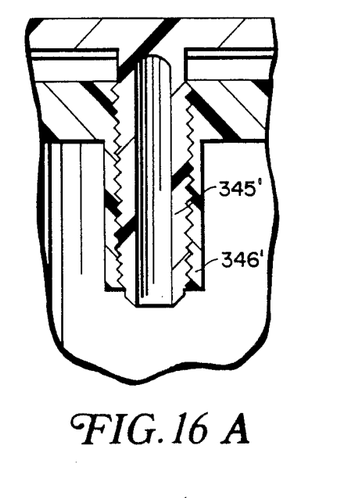

In FIG. 16 there is illustrated still another exemplary embodiment of a cap construction according to this invention. Again, like numerals but prefixed by a "3",are used to designate common components. In this exemplary embodiment, a flat, disc-like upper portion 332 of the cap 315 is freely slidable within the lower portion 331 for gravity actuated movement between open and closed positions. Whereas the upper portion 232 in the FIG. 15 embodiment, once opened, remains open until pushed closed, the upper portion 332 in FIG. 16 will remain in a normally closed position so long as the container is in an upright position. Upon inverting, or at least tilting beyond a horizontal orientation, as when liquid is to be dispensed from the container, the upper portion will automatically slide to an open position to permit liquid to flow out of the container in the manner previously described.

More specifically, the upper portion 332 of the cap is provided with an elongated, hollow stem portion 345 which is freely slidably received within a bore provided in a concentrically arranged, sleeve-like portion 346 which depends from the interior of the lower cap portion. As in the FIG. 15 embodiment, the lower edge of stem 345 is flattened after assembly to provide stop means in the form of a flange 347 which captures the upper portion 332 within the lower portion 331. A left hand thread is preferred for the closing direction.

It will be understood that the stem 345 and sleeve like portion 346 are dimensioned such that there is sufficient clearance to enable the upper portion to slide freely within the bore, but not enough to permit the escape of any liquid from the container through the tube 12.

As in the FIG. 15 embodiment, the stem 346 has an axial length greater than the sleeve-like portion in order to create space 338 when the upper portion is gravity actuated to an open position. Upper portion 332 may be formed with a depending skirt-like edge 333 which surrounds the upper edge of lower portion 331 when in the closed position. The cap otherwise functions identically to the previously described caps.

In FIG. 16A, a variation of the cap structure of FIG. 16 is shown wherein the stem 345' and sleeve like portion 346' are respectively provided with complimentary screw threads enabling the upper portion 333 of the cap to move between open and closed positions upon relative rotation between upper cap portion 332 and lower cap portion 331. A left hand thread is preferred for the closing direction.

Turning now to FIG. 17, an adaptor 50 is shown which serves to convert a standard snap-on cap container or bottle to a screw-on cap container. While the previously described cap constructions have been described in terms of use with screw-on cap containers, plastic bottles and the like, it is also typical of prior art containers to have a snap-on configuration, as previously described in conjunction with FIG. 14, wherein caps are simply pushed over a series of raised circumferential beads or the like. In order to facilitate use of the water treatment apparatus described herein with both types of conventional prior art bottles or containers, an adaptor 50 is provided. As shown, the adaptor 50 comprises an annular band of material, preferably plastic, which is provided on its interior surface with a plurality of raised ribs 52, 54. The exterior surface is provided with a conventional screw thread configuration 56. The adaptor is designed to be placed over a conventional snap-on cap container such that the ribs of the adaptor snap into place over cooperating ribs or rings formed on the container neck. Cap constructions as described in conjunction with FIGS. 10, 11, 13, 15, 16 and 16A are then simply screwed onto the container in a conventional fashion. While the variously described cap constructions may be formed with ribs or snap rings for use with snap-on type containers, it will be appreciated that the adaptor 50 provides a convenient expedient allowing the use of a single cap construction of uniform design with different container and bottle types.

Figure 18:
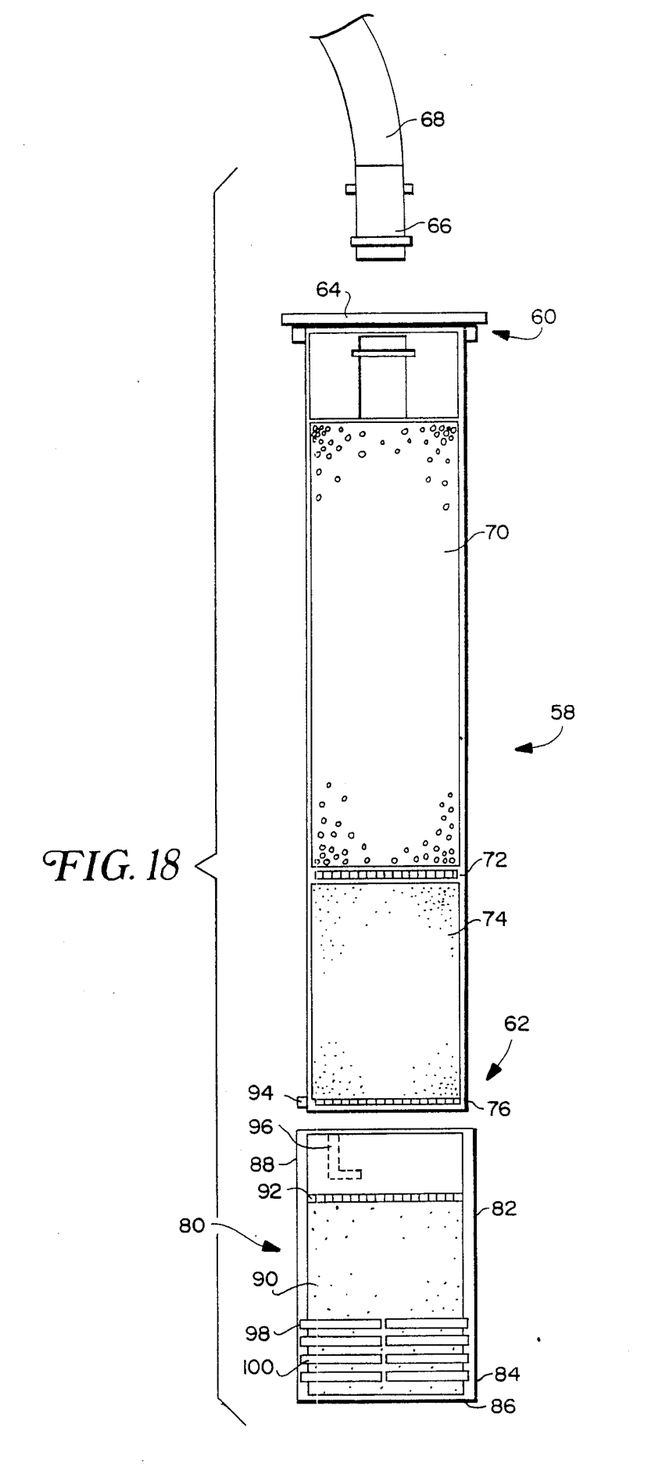
FIG. 18 is a cross-sectional view of an improved tube and cartridge structure in accordance with the invention.

With reference now to FIG. 18, a second exemplary water treatment apparatus is illustrated which includes a substantially cylindrical tube 58 having an upper inlet end 60 and a lower outlet end 62. The upper end 60 may be formed or provided with a flanged entry 64 adapted to receive a quick disconnect fitting 66 attached to a hose or water faucet connection 68. The hose itself contains a carbon or adsorbent media 70, such as ion-exchange resins above a first retaining screen 72, and may also contain a biocidal media 74, such as halogenated resin fibers and/or halogenated beads, between the screen 72 and a second retaining screen 76 at the lower outlet end 62 of the tube.

It will be understood that the tube may be easily attached to a water faucet, water hose, or other water discharge device so that the water is constrained to flow through the filter media, and biocidal media if present, to remove contaminants prior to discharge from the lower end 62 of the tube.

Figure 19:
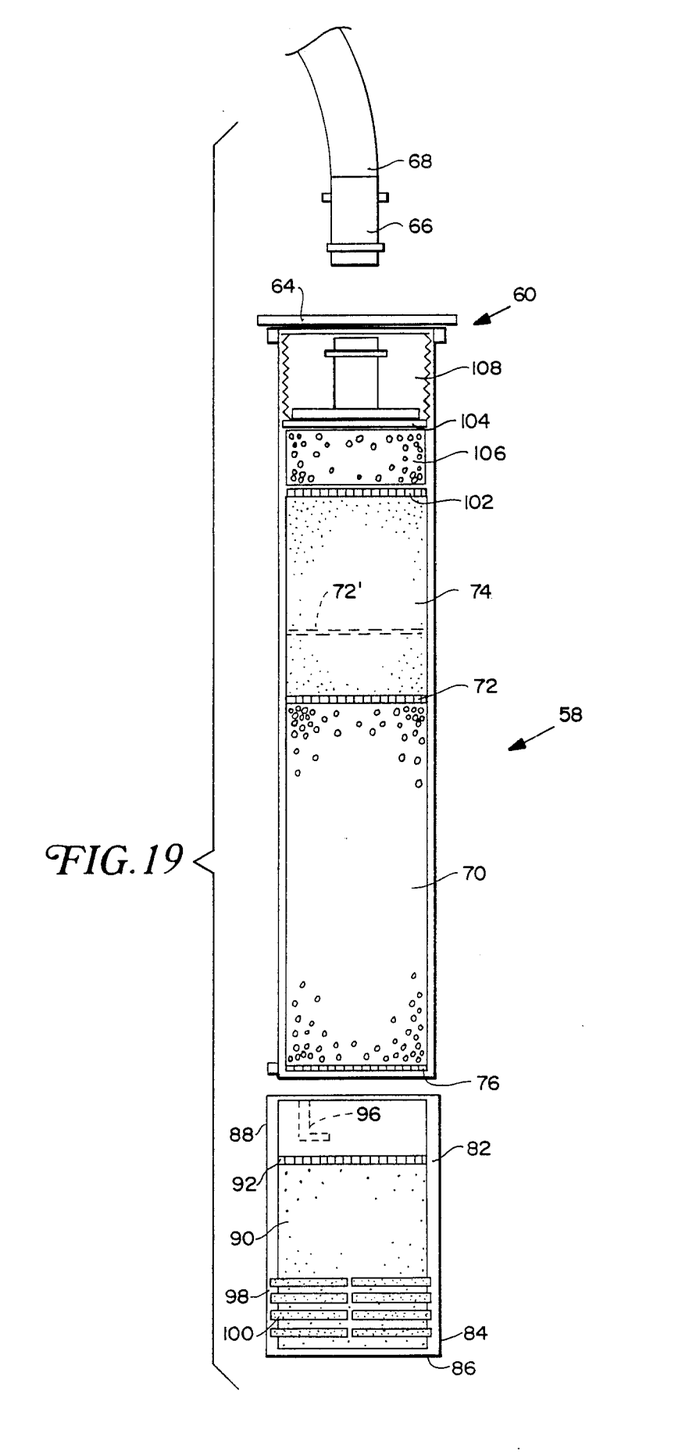
FIG. 19 is a cross-sectional view of a tube and cartridge structure as shown in FIG. 18 but with the filter media reversed.

In a variation of the above, shown in FIG. 19, the positions of the carbon media 70 and biocidal media 74 may be reversed, so that the biocidal media sits atop the carbon media, separated by the retaining screen 72. An additional retaining screen 102 is located above the biocidal media 74. In this alternative embodiment, it is also be desirable to provide a micron filter 104 vertically spaced above the screen 102 such that a chamber for additional adsorbent media 106 is created. A threaded insert 108 provides easy access to the micron filter 104 for replacement as required.

There is also shown in FIG. 19 (in phantom) still another alternative wherein an additional retaining screen 72' is located in vertically spaced relationship to screen 72, and the space therebetween is left void of any filter media. This arrangement has the advantage of reducing the amount of media required while allowing additional residence time. More specifically, the water, having passed through the halogenated resin (fibers or beads) column, contains from 0.5 ppm to 6 ppm of a halogen such as iodine or bromine, eluted from the preceding filter bed. The presence of the halogen within the water provides further sterilization without the need of the resin in actual contact, thereby reducing the amount of resin required. The eluted halogen is subsequently scavenged by the following column of activated carbon, thus removing the halogen prior to discharge for consumption.

In a related aspect of the invention, a replaceable filter cartridge is provided for use with the above described water treatment tube shown in FIGS. 18 and 19. The cartridge, shown at 80, includes a housing, defined by a cylindrical wall 82, closed at its lower end 84 by a bottom wall 86. The upper end 88 of the housing is open for reception therein of a mass of filter media 90 which may or may not be further combined with a flavoring concentrate such as juice or the like, minerals, vitamin supplements, etc. Above the media mass, but spaced below the upper end 88 of the housing, there is located a retaining screen 92 which fits snugly within the cartridge and which maintains the media in place between the bottom wall 86 and screen 92. At the same time, the retaining screen permits water to pass therethrough and itself performs a filtering function.

The space between the retaining screen 92 and upper end 88 of the cartridge allows the cartridge to be telescopically assembled over the lower end 62 of the tube 58, and held in place thereon by a friction fit. Of course, a twist lock or a threaded connection may also be used, as shown at 94, 96, respectively.

The lower portion of the cylindrical wall is provided with a plurality of circumferentially arranged louvers 98. The louvers are located below the screen 92 and provide the only means of exit for the water which enters the cartridge. The louvers are also screened as at 100 to prevent escape of media.

The louver design aids in dispersion and retards flow for treatment in an early stage. It also protects the screen material and maintains continuity of the smooth inner screen surface, thus precluding channeling within the media at the interface of screen and media which could negatively impact residence time and filtering characteristics.

The advantages of the disclosed cartridge design will be readily apparent, e.g., the contaminants are first removed from the water which is then blended with the flavoring concentrate, for example, to produce a consistent and uniform-tasting beverage.

Exemplary apparatus according to the present invention having been described, an exemplary manner of the use thereof will now be set forth.

With respect to the first described embodiment, the cartridge 13 is filled with a suitable water treatment media, such as activated charcoal, and is inserted into the second end 18 of the tube 12 so that it is disposed in place within the tube 12, or slips over the exterior of the tube 12, depending upon the relative diameters of the components. Alternatively the cartridge 13 may have an interior diameter substantially the same as the exterior diameter of the tube at end 18, and they are joined together by matching tapered edges.

The tube 12 is then inserted into the bottle or container 11, the second end 18 thereof passing through the neck 11' of the bottle 11, and insertion continuing until the projections 19 engage the interior surface of the neck 11, providing an interference fit therewith, and the cross portion of each "L", 20, engages the top of the neck 11'. This structure, with the cap 15 removed, is then filled with water, as from a faucet 30 (see FIG. 2), the water passing through the tube 12, and the media within the cartridge 13, which treats the water, and the water then flowing to the interior of the bottle 11. The flange 25 substantially prevents any liquid from flowing into the bottle 11 between the exterior surface 22 of the tube 12 and the interior of the neck 11'.

Figure 3:
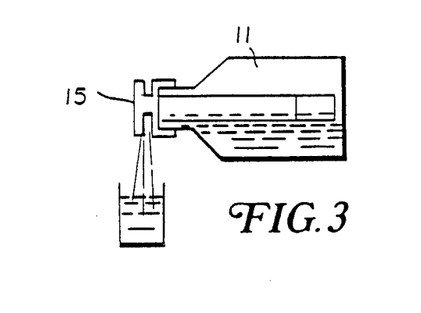
FIG. 3 is a side schematic view of the device and bottle of FIG. 1 as utilized for pouring treated liquid out of the bottle.
Figure 4:
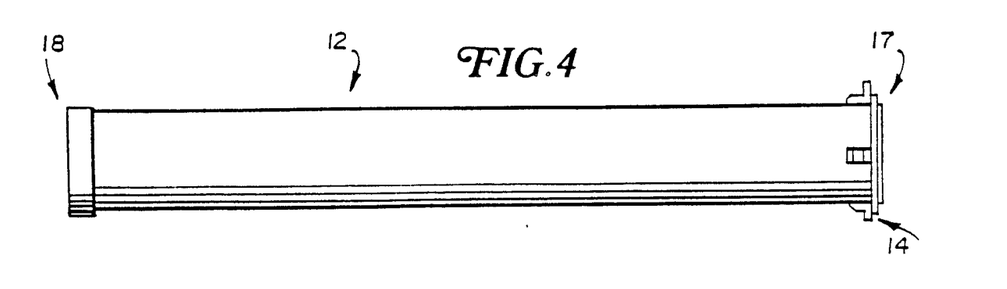
FIG. 4 is a side view of the elongated tube component of the device of FIG. 1.

After a sufficient volume of water has been introduced into the bottle 11, a cap as disclosed in any one of FIGS. 10, 11, 13, 14, 15 and 16 is disposed on top of the bottle by placing the lower portion 31 thereof over the bottle neck 11', and then snapping or screwing the cap into place. If the bottle is of the snap-on type, an adaptor 50 may be used to convert it to a screw-on type as previously described. Screwed down completely, the central portion 40 of the cap will abut and seal the top of the tube 12 adjacent the open end 17 thereof. When it is desired to use the treated drinking water within the bottle 11, as illustrated in FIG. 3 the bottle is merely turned over to pour the liquid out of the top, the liquid passing, as illustrated by the flow arrows in FIG. 11 and as illustrated schematically in FIG. 3, between the exterior surface 22 of the tube 12 and the interior of the neck 11' of the bottle, past the flange 25, through openings (one or more openings) 36, into the space 38 between the cap portions 31, 32, and completely out of the bottle. It will be understood that if the cap is of the type disclosed in FIG. 15, upper portion 232 must first be pulled upwardly into an open position.

Because the openings 36 are provided around the complete circumference of the cap, it does not make any difference what the orientation of the bottle is during pouring.

With regard an exemplary use of the second described embodiment illustrated in FIG. 18, and the variation thereof shown in FIG. 19, a cartridge 80 containing a flavor concentrate or mineral or vitamin supplement, is fitted onto the lower end 62 of the tube 58. Tube 58, in turn, houses one or more of the previously described compositions including, for example, a carbon or absorbant media 70 and a biocidal media 74. The tube and cartridge assembly is fitted to a water faucet or other water source, so that water is forced to flow into the tube at the inlet end 60. The water then flows through the tube media, through the cartridge, and discharges through the screened louvers 98.

It will also be appreciated that the tube 58 and cartridge 80 may also be used with a container, in the manner of tube 12, cartridge 13 and container 11, and in further conjunction with any of the caps described hereinabove.

It will be further appreciated as back pressure develops within the cartridge, the tube 58, used as a standpipe, provides a pressure head allowing control of the residence time of the water within the filter media during the early stages of filling.

In addition, it may also be desirable in some circumstances to keep the cartridge 80 submerged, thereby inhibiting fungal growth in the filter media.

The replaceable cartridge 80 is, of course, easily removable when no longer effective for its intended purpose, and easily replaced by a new cartridge with similar or different media therein.

It will thus be seen that according to the present invention a simple, inexpensive, yet effective water treatment apparatus has been provided for treating water for drinking, household use, and the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A cap for use with water treatment apparatus wherein the cap is adapted to cooperate with an open neck of a bottle having an exterior projection formed on the neck thereof, and a tubular member inserted within the open neck, said cap comprising:

a lower component having a circumferentially continuous lower portion which has an interior projection adapted to cooperate with the exterior projection of the bottle, and surface means for cooperatively engaging the tubular member mounted in the open neck of the bottle to seal the tubular member; and a top portion of said lower component having a central part, and a peripheral part which has a plurality of circumferentially spaced through-extending openings therein, said openings disposed substantially 360 degrees around the circumference of said peripheral part of said top portion; and an upper component having a depending stem which is constrained to axially slidable movement in a bore formed in said central part between a closed position wherein said upper component covers said openings, and an open position wherein said upper component is axially spaced from said lower component around the periphery thereof so that liquid may freely flow through the openings in said lower component top portion when said surface means is not in engagement with said tubular member, and then between the upper component and the lower component under the force of gravity.

2. A cap as recited in claim 1 wherein said upper component is releasably connected to said lower component.

3. A cap as recited in claim 1 wherein said upper component is freely slidably received within said lower component for movement between said open and closed positions by force of gravity.

4. A cap as recited in claim 1 wherein said projections on said cap and said bottle are cooperating screw threads.

5. A cap as recited in claim 1 wherein said projections on said cap and said bottle are snap rings.

6. A cap as recited in claim 1 wherein said upper component is frictionally slidably received within said lower component for selective movement between said open and closed positions.

7. A cap as recited in claim 6 wherein said projections on said cap are screw threads and said projections on said bottle are annular raised ribs and wherein said apparatus further includes adaptor means for permitting said cap to be connected to said bottle.

8. A cap as recited in claim 7, wherein said adaptor means comprises an annular ring provided with screw threads on an exterior surface thereof and annular raised ribs on an interior surface thereof, so that said adaptor means may be snapped onto said bottle to convert said bottle from a snap-on type to a screw-on type.

* * * * *